Aug. 21, 1928.
R. M. GALLOWAY
1,681,288
POSITIVE TAPPING MECHANISM FOR MULTIPLE SPINDLE MACHINES
Filed July 18, 1925 2 Sheets-Sheet 1
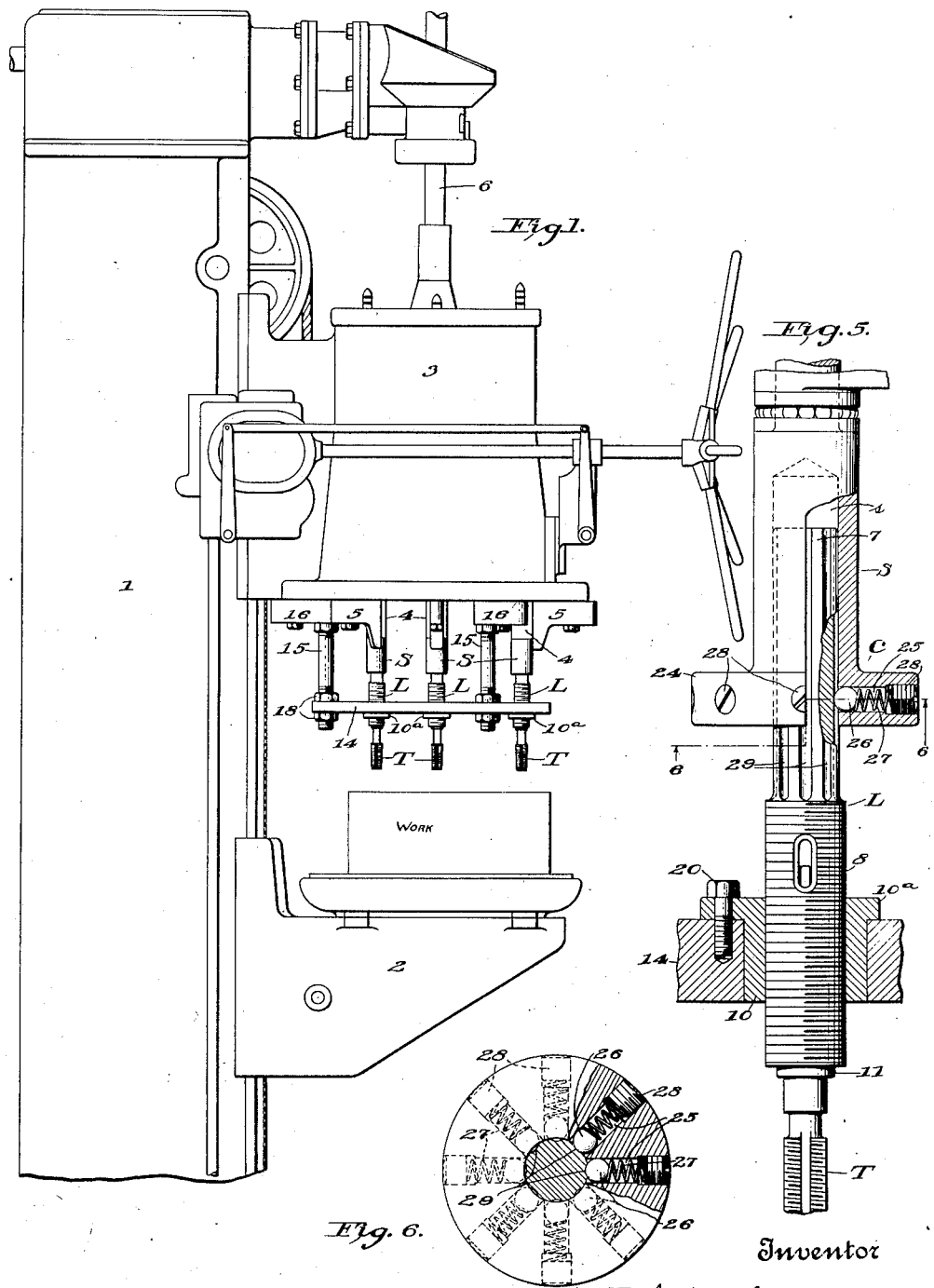
Inventor
Robert M. Galloway
By Attorney
Albert F. Nathan Aug. 21, 1928.  1,681,288
R. M. GALLOWAY
POSITIVE TAPPING MECHANISM FOR MULTIPLE SPINDLE MACHINES
Filed July 18, 1925  2 Sheets-Sheet 2
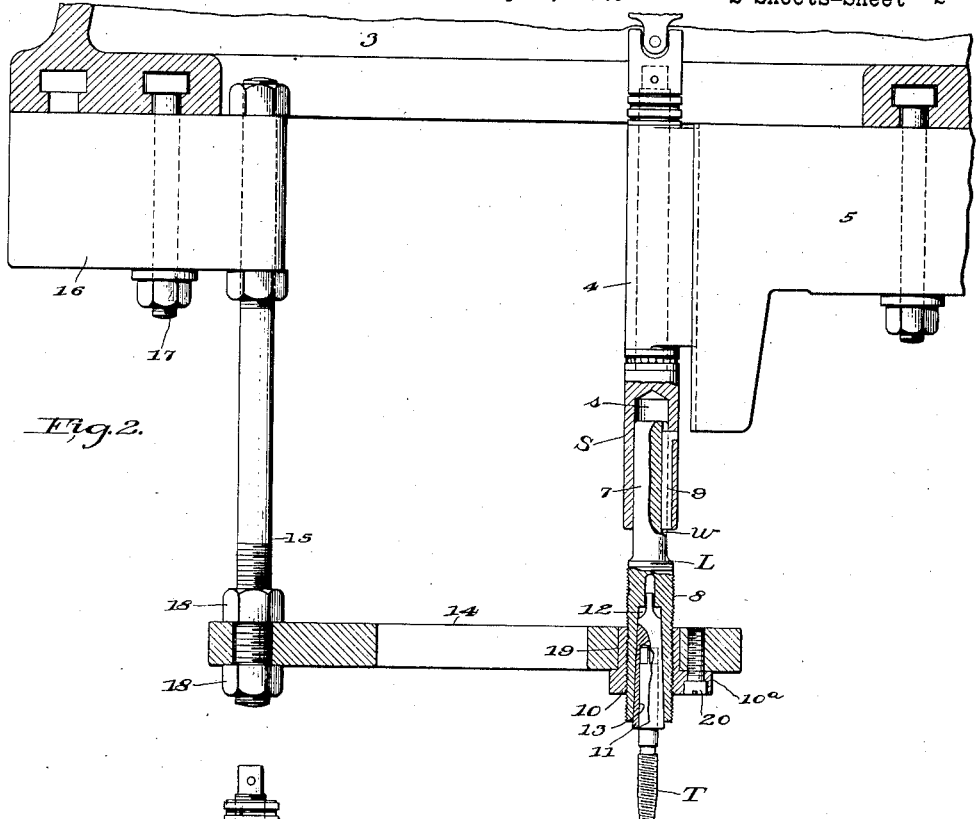
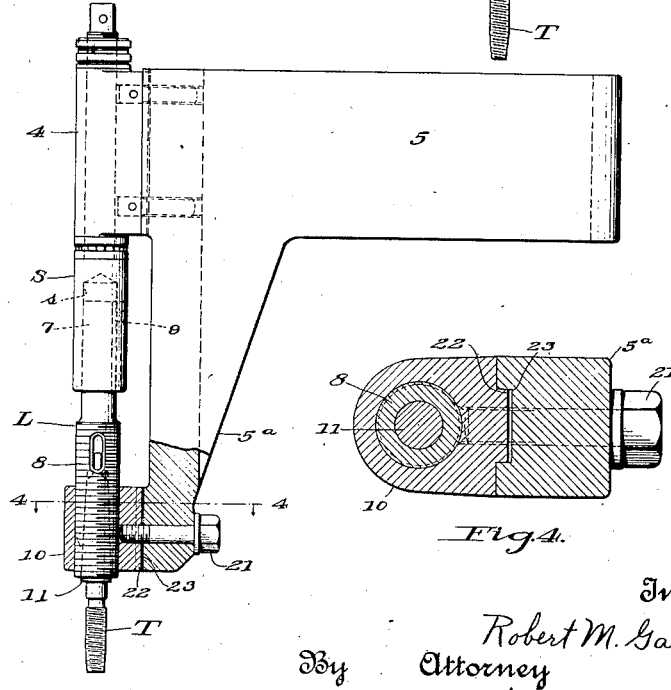
Inventor
Robert M. Galloway
By Attorney
Albert F. Nathan Patented Aug. 21, 1928.

1,681,288

UNITED STATES PATENT OFFICE.

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA.

POSITIVE TAPPING MECHANISM FOR MULTIPLE-SPINDLE MACHINES.

Application filed July 18, 1925. Serial No. 44,440.

This invention relates to multiple spindle machine tools and it deals more particularly with means for feeding the individual tools axially independently of each other and independently of the spindles, as they are being rotated thereby. This invention is particularly adaptable to multiple spindle tapping machines in which the axial movement may be utilized to feed the taps into the work.

In the manufacture of certain products it is necessary that holes of substantially different diameters be tapped with threads of various pitch and inasmuch as each different pitch thread requires a different tap feed, and as multiple spindle tapping machines, as commonly constructed provide no means for feeding the individual taps independently of each other, it has heretofore been difficult to utilize these machines simultaneously to tap a plurality of holes having threads of different pitch. To perform tapping operations by multiple spindle machines of the type in which the spindles are journaled in a single head, it has heretofore been customary to provide tap-holders each having individual float, i. e. the tap is so held in the tap-holder that relative axial movement is permitted between the two. With this construction the feed of each tap is effected by the lead thereof and no means is provided for positively advancing the tap at the proper rate. This method of tapping threads is not entirely satisfactory because of the fact that the taps are subjected to end strains which cause them to drag, with the results that they do not advance at the proper rate and therefore produce defective threads.

This invention has for an object so to equip a multiple spindle machine that it may be utilized simultaneously to tap a plurality of holes with threads of substantially different pitch.

More specifically stated, this invention has for an object to provide in a multiple spindle machine simple and effective means simultaneously and independently to advance a plurality of taps, of various pitch, at a rate coordinated with the speed of rotation of the taps so that said taps will simultaneously tap threads of different pitch.

Another object of the invention is to provide in a multiple spindle machine interchangeable means for independently feeding the individual taps whereby various combinations of tap feeds are rendered available for various classes and types of work.

A still further object of this invention is to provide, in a multiple spindle machine, means to give individual feeding movements to taps carried by the various spindles and so to construct and arrange said means that it may be removed from the machine tool to permit the machine to perform operations other than tapping.

Still another object is to provide, in a multiple spindle machine, means independent of the spindles, and located adjacent the tools, to give to the tools individual axial movement as they are rotated by the spindles.

Another object of this invention is to combine with each of the individual tap feeds a safety device by means of which, under normal working conditions, the tap will be rotated by its spindle but which under abnormal condition will permit the spindle to rotate independently of the tap, such for example, as when the tap strikes the bottom of the holes and is thereby prevented from advancing further under the action of the lead-screw, or when the tap breaks in the work and the broken off portion acts as a plug to prevent further entry of the tap into the work. Under these conditions without the present safety device the continued rotation of the tap without its further advance would either result in stripping the threads already cut or destruction of some part of the mechanism. With the improved safety device the tap may be brought to rest and the spindle continues to rotate without any disastrous results.

These objects have been attained by embodying in a multiple spindle machine tool individual lead-screws each translatably but non-rotatably connected with one of the spindles. Each lead-screw is threaded through a stationary nut and is designed to receive an adapter within which standard taps of various sizes may be secured. As the lead-screw is rotated by the spindle its engagement with the fixed nut causes the lead-screw and the tap carried thereby to be fed axially a predetermined amount at each rotation of the spindle, therefore by selecting a lead-screw and nut having the same pitch thread as the tap to be used the rotary and axial movements of the lead-screw will be so coordinated as to cause the tap to cut a perfect thread into the work. This invention proposes various ways of supporting the lead-screw nuts. One of these consists in removably securing them in a plate supported by the machine-head intermediate the head and the work. This construction is particularly advantageous on quantity production as the plate may be made with nut-receiving sockets located in any predetermined arrangement according to the work to be drilled, and the individual spindles, being universally adjustable, may be located in accordance with the arrangement of the nuts secured in said sockets.

Another means for supporting the lead-nuts, which may be desirable in certain classes of work, consists in securing each of the nuts to one of the spindle supporting and adjusting arms adjustably carried by the tool-head. With this arrangement each of the nuts is universally adjustable with its cooperating spindle.

The safety device adapted to permit continued rotation of the spindle after the tap has been brought to rest preferably comprises a ball clutch intermediate the spindle and lead-screw and is designed to transmit a predetermined torque sufficient to effect ordinary tapping operations but adapted to slip when such predetermined torque is exceeded.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a side elevation of a portion of a multiple spindle drilling and tapping machine embodying the present invention. Fig. 2 is an enlarged sectional view of a portion of Fig. 1 showing a lead-nut carried by a plate supported beneath the tool-head. Fig. 3 is a modification showing the lead-nut carried by a spindle supporting and adjusting arm adapted to be adjustably secured to the tool-head. Fig. 4 is a section on the line 4—4 of Fig. 3. Fig. 5 is a detail sectional view showing a safety device combined with the means for giving the spindle individual translation comprising a ball-clutch between the tool spindle and the lead-screw. Fig. 6 is a section on the line 6—6 of Fig. 5.

Referring more particularly to the drawings, the invention is disclosed as embodied in a multiple drilling and tapping machine comprising a standard 1 upon which are adjustably supported a work-table 2 and a tool-head 3. Conventional means (not disclosed) is provided for translating the tool-head on the standard. Within bearings 4 carried by arms 5 adjustably secured to the tool-head, are rotatably journaled a plurality of tool spindles S adapted selectively to be rotated individually at any one of a plurality of rates from a power shaft 6 entering the tool-head from the top. Inasmuch as the means for rotating the spindles and for varying their individual speed of rotation are conventional and form no part of this invention detailed illustration and description thereof is deemed unnecessary. The spindle supporting arms are universally adjustable on the tool-head and therefore any desired arrangement of spindles may be secured. Although Fig. 1 shows only three spindles carried by the tool-head it is to be understood that this is merely illustrative and that in practice a materially greater number may be employed.

As hereinbefore stated this invention provides means to translate the tools as they are rotated by the spindles. To this end each spindle has translatably but non-rotatably secured within its bore $s$ the shank 7 of a lead-screw L. A spline 9, carried by the spindle is fitted to a way $w$ in the shank 7 and thereby causes the lead-screw to be rotated with the spindle while permitting it to be moved axially in the spindle. The lead-screw is formed with a threaded portion 8 which engages a stationary lead-nut 10 and therefore rotatation of the screw L in the nut causes the screw to be moved in the direction of its length. The lead-screw is adapted to carry standard taps T of various sizes and these taps may be connected with the spindle by means of a tapered adapter 11 fitted within a tapered bore 12 in the lead-screw and formed with a tap-receiving socket 13.

As shown in Figs. 1 and 2, the lead-nuts 10 may be removably attached to a plate 14 carried by the lower end of bars 15 whose upper ends are secured to arms 16 adjustably secured to the tool-head 3 by bolts 17, in a manner similar to the arms 5. Jam-nuts 18 serve to secure the plate 14 to the bars 15 and provide a limited vertical adjustment of the plate. With the construction shown in Figs. 1 and 2 the lead-nuts are preferably fitted within suitably arranged sockets 19 formed in the plate 14. The nuts are provided with flanges $10^a$ which rest against one face of the plate and screws 20 prevent movement of the nuts in their sockets.

For certain classes of work it may be desirable to have the lead-nuts adjustable with the tool-spindles instead of having them secured in permanent arrangement in the plate 14. Figs. 3 and 4 illustrate one way in which this may be accomplished. The arms 5 may be provided with extensions 5ᵃ to which the lead-nuts 10 may be secured as by means of bolts 21 passing through the extension and threaded into the nuts. To prevent turning of the nuts about the axis of the bolts 21 the nuts may be provided with tongues 22 fitted into complemental grooves 23 in the extensions 5ᵃ.

In practice the pitch of the thread of the lead-screw and lead-nut will be the same as the pitch of the tap being used so that the lead-screw will be advanced at the same rate as the tap. The lead-screw and lead nut are readily removable from their respective supports and therefore they may be interchanged or removed at will and replaced by others having a different pitch when a different pitch tap is to be used.

As hereinbefore stated this invention also contemplates the use of a safety device in combination with the lead-screw and nut. A device of this nature is illustrated in Figs. 5 and 6 and consists of a ball-clutch C intermediate the spindle and shank of the lead-screw. The clutch preferably comprises a flange 24 formed with a plurality of radially disposed apertures 25 within each of which is located a ball 26 forced inwardly by a spring 27 having one end seated against a tension adjusting screw 28 threaded into the flange. The balls 26 are each adapted to engage a groove or flute 29 cut lengthwise in the shank 7 of the lead-screw whereby the lead-screw is rotated with the spindle to cause rotation of the tap. The ball-clutch is positive in its action to transmit a predetermined torque but when the torque exceeds a predetermined maximum as might be caused by the tap striking the bottom of the hole (thereby stopping its axial feed and consequently retarding its rotation) the grooves 29 will force the balls 26 outwardly in the apertures 25, against the action of the springs 27, and permit the spindle to rotate without rotating the lead-screw and tap.

From the foregoing it will be perceived that this invention provides a construction having all of the advantages of a multiple spindle tapping machine (i. e. permitting a plurality of holes to be tapped simultaneously combined with all of the advantages of a single spindle tapping machine in that each individual tap is rotated and advanced independently of every other tap. Furthermore the invention provides in a machine tool having these combined advantages, a simple and efficient safety device by means of which damage to both the tap and work is precluded when the tap strikes the bottom of the hole and when the tap breaks in the work.

Without further analysis, the foregoing will so fully reveal the gist of this invention that others can, by applying current knowledge, readily adapt it for various utilizations by retaining one or more of the features that, from the standpoint of the prior are, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A multiple spindle tapping machine combining a work-support; a head, said work-support and head being relatively movable; a plurality of rotatable spindles journaled in said head; a lead-screw translatably but non-rotatably connected with each of said spindles; a tap carried by each of said lead-screws; a member supported by said head and located intermediate the spindles and the work to be operated on; and a plurality of lead-nuts sustained by said member and each having a threaded connection with one of said lead-screws to give to said taps individual axial movements from the rotary movement of its rotating spindle.

2. A multiple spindle tapping machine combining a translatable tool-head; a plurality of rotatable spindles adjustably supported by said tool-head; a lead-screw associated with each of said spindles; a tap rotated from each of said spindles and having an operative connection with one of said lead-screws; a member supported by said tool-head and maintained intermediate the tool-head and the work to be operated on; and a plurality of threaded sockets in said member each having an operative connection with one of said lead-screws to cause said lead-screws to be translated as they are rotated.

3. A multiple tapping machine combining a translatable tool-head; a plurality of rotatable spindles adjustably supported on said tool-head; a threaded member translatable but non-rotatable relative to each of said spindles; a tap carried by each of said threaded members; a plate adjustably supported by said tool-head; and a plurality of nuts supported by said plate and each having an operative connection with one of said threaded members between its rotating spindle and the tap rotated thereby to give to said taps individual axial movement.

4. A tapping machine combining a translatable head; a plurality of rotatable spindles carried thereby; a lead-screw translatable but non-rotatable relative to each of said spindles; a tap rotated by each of said lead-screws; a member supported intermediate the spindles and the work to be operated on; a plurality of lead-nuts carried by said member and each having a threaded connection with one of said lead-screws independently to advance said lead-screws as they are rotated by said spindles; and means permitting the ready removal of said lead-screws and nuts and the substitution of other lead-screws and nuts having threads of a different pitch.

5. A multiple tapping machine combining a plurality of rotatable spindles; a tap-holder having a fluted shank, operatively connected with each of said spindles; means to give to each of said tap holders individual axial movements; and a ball-clutch carried by each of said spindles and engaging the flutes of said tap-holder, thereby to transmit to said tap-holder a predetermined torque and to permit axial movement of the tap-holder in the spindle.

6. A tapping machine combining a frame; a tool-head mounted thereon; a work-support carried by said frame, said tool-head and work-support being relatively movable; spindle-supporting arms secured to said tool-head; a spindle rotatably journaled in each of said arms; plate-supporting arms also carried by said head; a plate supported from the last named arms and located between the spindles and the work-support; lead-nuts supported by said plate; a lead-screw having a splined connection with each of said spindles and threaded through one of said lead-nuts whereby rotation of said spindles effects rotary and axial movements of said lead-screw; and a tap supported by and rotatable and movable axially with each of said lead-screws.

7. A tapping-machine combining a frame; a tool-head mounted thereon; a work-support carried by said frame, said tool-head and work-support being relatively movable; spindle-supporting arms secured to said tool-head; a spindle rotatably journaled in each of said arms; plate-supporting arms also carried by said head; spacing members attached to the last named arms; a plate adjustably supported on said spacing members, said plate being located intermediate the spindles and the work-support; lead-nuts supported by said plate; a lead-screw having a splined connection with each of said spindles and threaded through one of said lead-nuts whereby rotation of said spindles effects rotary and axial movements of said lead-screw; and a tap supported by and rotatable and movable axially with each of said lead-screws.

In witness whereof, I have hereunto subscribed my name.

ROBERT M. GALLOWAY.